United States Patent
Lee

(10) Patent No.: US 10,619,749 B2
(45) Date of Patent: Apr. 14, 2020

(54) FLOW-CONTROLLING UNIT HAVING FUNCTION OF LIMITING TILTING ANGLE OF FLOW-CONTROLLING PIECE

(71) Applicant: Jang Woo Lee, Gyeonggi-do (KR)

(72) Inventor: Jang Woo Lee, Gyeonggi-do (KR)

( * ) Notice: Subject to any disclaimer, the term of this patent is extended or adjusted under 35 U.S.C. 154(b) by 0 days.

(21) Appl. No.: 15/123,102

(22) PCT Filed: Mar. 5, 2015

(86) PCT No.: PCT/KR2015/002122
§ 371 (c)(1),
(2) Date: Sep. 1, 2016

(87) PCT Pub. No.: WO2015/133834
PCT Pub. Date: Sep. 11, 2015

(65) Prior Publication Data
US 2017/0219108 A1   Aug. 3, 2017

(30) Foreign Application Priority Data

Mar. 5, 2014 (KR) .......................... 10-2014-0026219
Sep. 22, 2014 (KR) .......................... 10-2014-0125480

(51) Int. Cl.
*F16K 15/14* (2006.01)
*E03C 1/02* (2006.01)
(Continued)

(52) U.S. Cl.
CPC ............ *F16K 15/144* (2013.01); *E03C 1/025* (2013.01); *E03C 1/08* (2013.01); *G05D 7/0173* (2013.01);
(Continued)

(58) Field of Classification Search
CPC ........ F16K 15/14; F16K 15/144; F16K 15/16; F16K 15/181; F16K 15/185;
(Continued)

(56) References Cited

U.S. PATENT DOCUMENTS 249,557 A * 11/1881 Truesdell .............. F16K 15/144
137/855
876,066 A * 1/1908 Klever .................... F16K 17/34
116/266
(Continued)

FOREIGN PATENT DOCUMENTS

DE   102005005473 A1 * 8/2006 ........... F16K 15/144
DE   102005005473 A1 * 8/2006 ........... F16K 15/144
(Continued)

OTHER PUBLICATIONS

Int'l Search Report dated Jun. 12, 2015 in Int'l Application No. PCT/KR2015/002122.

*Primary Examiner* — Mary E McManmon
*Assistant Examiner* — Richard K. Durden
(74) *Attorney, Agent, or Firm* — Revolution IP, PLLC

(57) ABSTRACT

A flow-controlling unit having a function of limiting the tilting angle of a flow-controlling piece which includes a flow-controlling plate, which is disposed perpendicular to the moving direction of a fluid in a flow channel. The flow-controlling plate includes first fluid through-holes through which the fluid passes and flow-controlling pieces which are provided in a part corresponding to the first fluid through-holes. The flow-controlling pieces are inclined in the direction of the inflow of the fluid and control the degree of opening of the first fluid through-holes by being tilted due to pressure applied from hydraulic pressure of the fluid. A tilting-angle-limiting plate has second fluid through-holes which communicate with the first fluid through-holes, wherein the diameter of the second fluid through-holes is smaller than the diameter of the first fluid through-holes, allowing the flow-controlling pieces to be supported to limit the tilting angle of the flow-controlling pieces.

10 Claims, 11 Drawing Sheets

(51) Int. Cl.
*F16K 17/26* (2006.01)
*E03C 1/08* (2006.01)
*G05D 7/01* (2006.01)

(52) U.S. Cl.
CPC ........ *E03C 2001/026* (2013.01); *F16K 17/26* (2013.01); *Y10T 137/7891* (2015.04)

(58) Field of Classification Search
CPC ........ F16K 15/188; F16K 17/22; F16K 17/24; F16K 17/26; F16K 17/28; F16K 17/34; F16K 25/00; F16K 25/02; Y10T 137/7888; Y10T 137/789; Y10T 137/7891; Y10T 137/7892; Y10T 137/7893; Y10T 137/7894; Y10T 137/7895; F04B 39/1046; F04B 39/108; F04B 39/1086; F04B 39/104; F04B 39/1066; F04B 39/1073; F04B 39/1093
USPC ........ 137/852, 854, 855, 856, 857, 858, 859
See application file for complete search history.

(56) References Cited

U.S. PATENT DOCUMENTS

| | | | | | |
|---|---|---|---|---|---|
| 2,684,079 | A | * | 7/1954 | Krohm | G05D 7/0173 137/493.9 |
| 2,899,981 | A | * | 8/1959 | Binks | F16L 55/04 137/855 |
| 3,057,373 | A | * | 10/1962 | Bragg | B64D 13/02 137/460 |
| 3,460,168 | A | * | 8/1969 | De Bruyne | E03C 1/28 137/544 |
| 3,514,231 | A | * | 5/1970 | Belden | E03D 5/01 137/855 |
| 4,024,889 | A | * | 5/1977 | Smith | F16K 15/144 137/517 |
| 4,076,047 | A | * | 2/1978 | Akahori | F01L 3/205 137/856 |
| 4,542,768 | A | * | 9/1985 | Harris | F16K 17/0413 137/513.5 |
| 5,063,958 | A | * | 11/1991 | Wisneskie | F16K 15/144 137/68.27 |
| 2005/0175490 | A1 | * | 8/2005 | Seto | F04B 43/04 417/559 |
| 2013/0199626 | A1 | * | 8/2013 | Teng | E03C 1/08 137/119.01 |

FOREIGN PATENT DOCUMENTS

| | | |
|---|---|---|
| JP | S 56151565 U | 11/1981 |
| JP | S59-11236 Y2 | 4/1984 |
| JP | H-04219575 A | 8/1992 |
| JP | H-06288480 A | 10/1994 |
| JP | 3026026 B2 | 3/2000 |
| KR | 20000020640 U | 12/2000 |
| KR | 200000020640 U * | 12/2000 ............. F16K 17/00 |

* cited by examiner

FLOW-CONTROLLING UNIT HAVING FUNCTION OF LIMITING TILTING ANGLE OF FLOW-CONTROLLING PIECE

CROSS-REFERENCE TO RELATED APPLICATIONS

This application is a section 371 of International Application No. PCT/KR2015/002122, filed Mar. 5, 2015, which was published in the Korean language on Sep. 11, 2015, under International Publication No. WO 2015/133834 A1, and the disclosure of which is incorporated herein by reference.

TECHNICAL FIELD

The present invention relates to a flow-controlling unit, and more particularly, to a flow-controlling unit equipped with a flow-controlling plate in which a flow-controlling piece is provided in the flow channel to reduce the variation range of the flow rate of the fluid discharged to the outside, and a tilting angle limiting plate configured to limit the tilting angle of the flow-controlling piece.

BACKGROUND ART

Typically, a discharge amount of tap water used in each home varies depending on the position of a faucet, even when using water pipes of the same dimension, and the water pressure and the discharge amount flowing through the water pipe vary due to the position of a water tank and a difference in level between the water tank and each faucet. Further, in the case of an aging water pipe, the discharge amount varies with the presence of foreign matter such as internal scale or the like.

Since the aforementioned water pressure is proportional to the dimensions of the water pipe and the flow rate of the water within the pipe, a faucet device fed by a weak water pressure will discharge less water than a faucet fed by a strong water pressure in the same amount of time.

Accordingly, high-rise buildings have a problem in that there is a need to accept a loss generated by the waste of some of the discharge amount due to the unnecessarily high water pressure.

In view of such a problem, a flow control device which measures the water pressure of the water pipe and reduces the cross-sectional area of the water pipe so that the discharge amount matches a reference value is disclosed. Thus, since the flow rate is controlled by controlling the area, regardless of the internal water pressure of the water pipe, many types of required flow control devices need to be manufactured depending on the dimension and the water pressure of the water pipe. Currently, since a specific flow control device is mounted after visiting each house to measure the dimensions of the water pipe, the water pressure and the discharge amount, after disassembling the valve, there is a problem in that a lot of labor and time for mounting the flow control device is taken.

Meanwhile, in a water supply device that is commonly used, if a user selects one either the cold water or the hot water, the other is closed. However, if a user tries to obtain the supply of adequate hot water, he controls a controlling lever. At this time, because the water pressure of the cold water is typically higher than the water pressure of the hot water supplied from a boiler, when the cold water and the hot water are mixed, there is a problem in that the cold water flows backward toward the hot water with a weaker water pressure, the fuel cost for producing the hot water increases, and economic efficiency is lowered.

In addition, when using the hot water forced backward by the cold water, there is a need to discharge a certain amount of water. However, because the hot water of an appropriate temperature is supplied, its usage is cumbersome. Also, since the water supplied until the hot water of a suitable temperature arrives is discarded, there is a problem of a wasted water.

DISCLOSURE

Technical Problem

The present invention was devised to solve the conventional problems described above, and objects of the present invention are as follows.

First, the present invention provides a flow-controlling unit having a tilting angle limiting function of the flow-controlling piece, configured to be capable of preventing wasted fluid due to excessive strong water pressure by always maintaining a constant flow rate of the fluid to be discharged.

Second, the present invention provides a flow-controlling unit having a tilting angle limiting function of the flow-controlling piece, configured to be capable of keeping a constant flow rate by a simple structure.

Third, the present invention provides a flow-controlling unit having a tilting angle limiting function of the flow-controlling piece, configured to be capable of preventing the flow of fluid from being blocked.

Fourth, the present invention provides a flow-controlling unit having a tilting angle limiting function of the flow-controlling piece, configured to be capable of preventing fluid from flowing in an inflow direction.

The objects of the present invention are not limited to the aforementioned objects, and other objects that have not been mentioned will be clearly understood by those skilled in the art from the following description.

Technical Solution

To achieve the aforementioned objects, the flow-controlling unit according to an embodiment of the present invention includes a flow-controlling plate and a tilting angle limiting plate.

The flow-controlling plate is disposed perpendicular to a movement direction of fluid in a flow channel, and at least one first fluid through-hole through which the fluid passes is/are formed in the flow-controlling plate, and flow-controlling pieces are formed, each flow controlling piece being aligned with a respective first fluid through-hole and being inclined in an inflow direction of the fluid such that each flow-controlling piece is tiltable, the flow controlling pieces controlling a degree of opening of the at least one first fluid through-hole by being tilted by the hydraulic pressure of the fluid.

Second fluid through-holes which communicate with the at least one first fluid through-hole are formed in the tilting angle limiting plate, and a diameter of the second fluid through-holes is formed to be smaller than a diameter of the at least one first fluid through hole to allow the flow-controlling pieces to be supported, thereby limiting the tilting angle of the flow-controlling pieces.

The tilting angle limiting plate allows the flow-controlling pieces and the flow-controlling plate to form a minimum angle to prevent a situation in which the flow-controlling piece is parallel to the flow-controlling plate due to the hydraulic pressure of the fluid and thereby blocks the flow of the fluid.

A closing preventing portion may be formed in the tilting angle limiting plate, the closing preventing portion being provided to have a height in at least part of an edge portion of the second fluid through-hole, and protruding in the direction of the inflow of the fluid through the at least one first fluid through-hole.

A first horizontal movement preventing portion may be formed in the tilting angle limiting plate to limit the horizontal movement of the flow-controlling plate by the periphery of the second fluid through-hole protruding to the flow-controlling plate side and inserted into the at least one first fluid through-hole.

Further, the flow-controlling unit of the present embodiment may further include a backflow preventing plate in which a third fluid through-hole, which communicates with the at least one first fluid through-hole and the second fluid through-hole, is formed, and is provided be in contact with the tilting angle limiting plate to prevent flowing of the fluid in the inflow direction.

A backflow preventing piece may be formed in the backflow preventing plate, the backflow preventing piece being inclined in a discharge direction, which is disposed opposite of the inflow direction, such that the backflow preventing piece is tiltable, the backflow preventing piece configured to prevent flow of fluid in the inflow direction by being pressed by hydraulic pressure when fluid flows in the inflow direction and by being tilted in the inflow direction of fluid against the backflow preventing plate.

The diameter of the backflow preventing piece is formed to be greater than the diameter of the second fluid through-hole, and the backflow preventing piece may be supported by the tilting angle limiting plate when the fluid flows in the inflow direction.

The backflow preventing plate may be formed of a thin plate having a thickness smaller than the thickness of the flow-controlling plate.

A second horizontal movement preventing portion, which protrudes in the discharge direction of the fluid, is formed at an edge of the tilting angle limiting plate, and the backflow preventing plate is inserted into the second horizontal movement preventing portion to limit the horizontal movement of the backflow preventing plate.

The flow-controlling pieces may form the at least one first fluid through-hole, by being partially cut from the flow-controlling plate and by being bent to the inflow direction of the fluid to form an inclination with the flow-controlling plate.

The flow-controlling piece may be coupled to the flow-controlling plate as a separate member.

Each of the flow-controlling pieces may be constructed from an elastic material such that a restoring force is provided to return the flow-controlling piece to its original, when the hydraulic pressure is removed.

Advantageous Effects

The effects of the present invention as described above are as follows.

First, according to the flow-controlling unit having the tilting angle limiting function of the flow-controlling piece according to an embodiment of the present invention, the inclination formed between the flow-controlling pieces and the flow-controlling plate is changed by the hydraulic pressure, and the flow rate of the fluid is kept constant at all times accordingly, by controlling the degree of opening of the fluid.

Second, according to the flow-controlling unit having the tilting angle limiting function of the flow-controlling pieces according to an embodiment of the present invention, since the flow rate of the fluid is kept constant at all times, a water saving effect can be expected.

Third, according to the flow-controlling unit having the tilting angle limiting function of the flow-controlling piece according to an embodiment of the present invention, since the flow-controlling pieces are formed by cutting and bending the flow-controlling plate, the flow rate can be kept constant by a simple structure.

Fourth, according to the flow-controlling unit having the tilting angle limiting function of the flow-controlling piece according to an embodiment of the present invention, since the tilting angle limiting plate, which allows the flow-controlling piece to maintain a minimum angle, with the flow-controlling plate at all times is provided, it is possible to prevent a situation in which the flow-controlling piece is completely closed to block the flow of fluid.

Fifth, according to the flow-controlling unit having the tilting angle limiting function of the flow-controlling piece according to an embodiment of the present invention, since the backflow preventing plate is provided, the flow of fluid towards the inflow direction can be prevented.

Effects of the present invention are not limited to the above mentioned effects, and other effects that have not been mentioned will be clearly understood from the scope of the claims to those skilled in the art.

BRIEF DESCRIPTION OF THE SEVERAL VIEWS OF THE DRAWINGS

The detailed description of the preferred embodiments of the present application to be described below, and the aforementioned summary will be able to better understand when read in conjunction with the accompanying drawings. The preferred embodiments are illustrated in the drawings for the purpose of illustrating the present invention. However, it should be understood that the present application is not limited to the illustrated precise arrangements and means.

BEST MODE

Hereinafter, embodiments of the invention will be described in detail with reference to the accompanying drawings. The drawings attached hereto are to help explain exemplary embodiments of the invention, and the present invention is not limited to the drawings and embodiments.

Further, terms used in this application are simply used for the purpose of describing the particular embodiments and are not intended to limit the present invention. Singular expressions include plural expressions, unless they are meant in a clearly different manner in the context. In this application, terms such as "includes" or "has" should be understood to specify the presence of features, numbers, steps, operations, constituent elements, components or a combination thereof described in the specification, rather than excluding the presence or additional possibility of one or other features, numbers, steps, operations, constituent elements, components or a combination thereof in advance.

Figure 1:
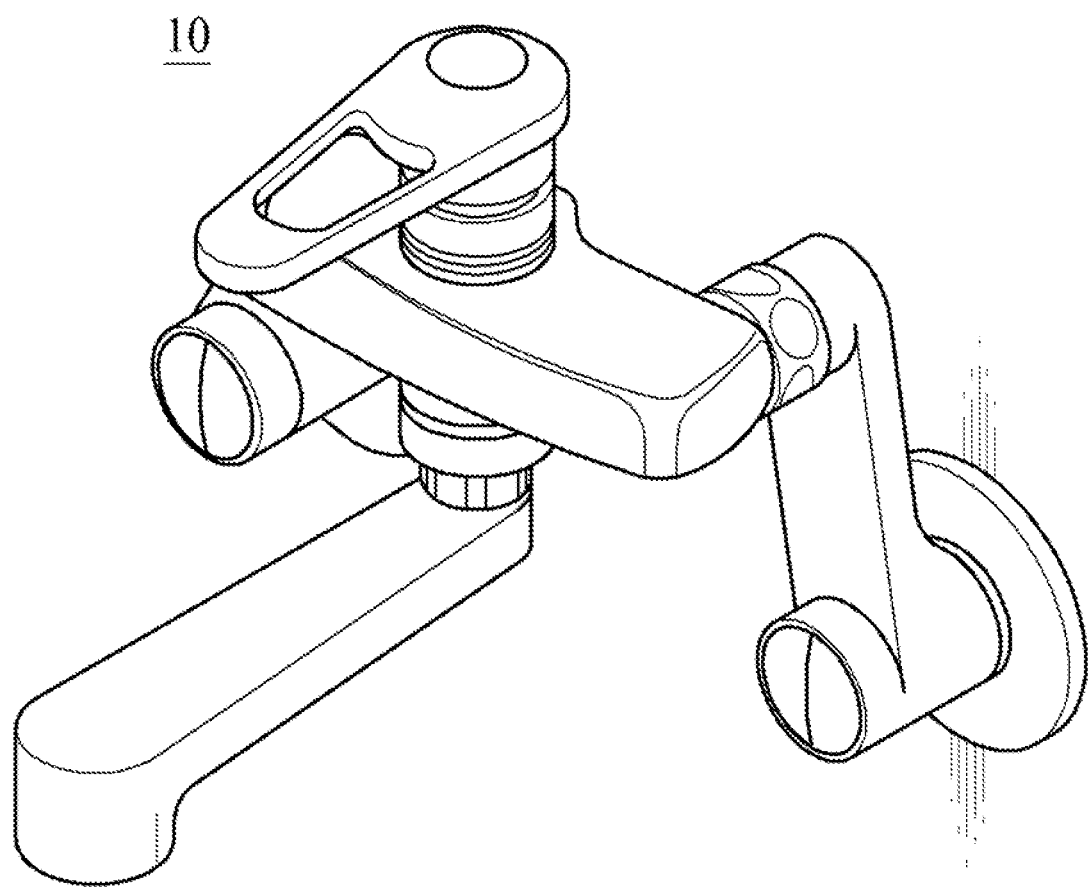
FIG. 1 is a front and top perspective view of a general household water supply device.
Figure 2:
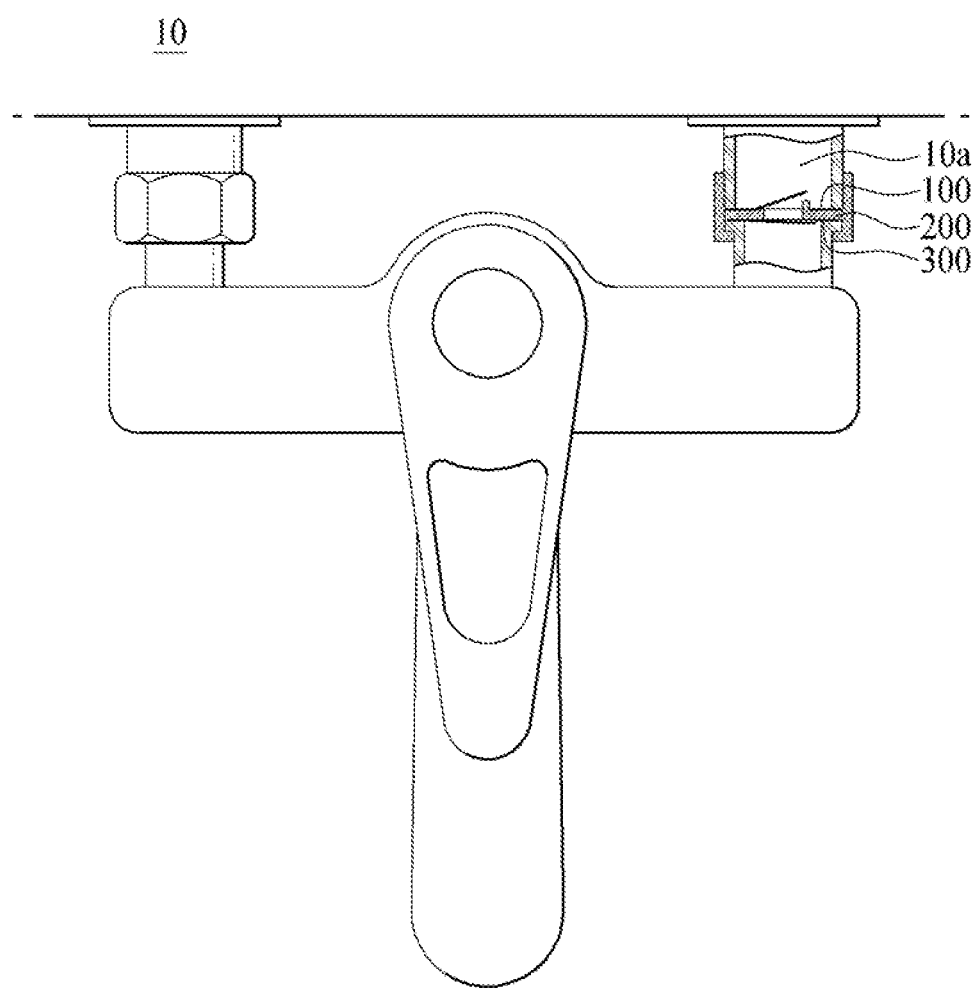
FIG. 2 is a top plan view of the general household water supply device of FIG. 1 in which the flow-controlling unit having the tilting angle limiting function of the flow-controlling piece according to an embodiment of the present invention is provided in an internal flow channel of the water supply apparatus.
Figure 6:
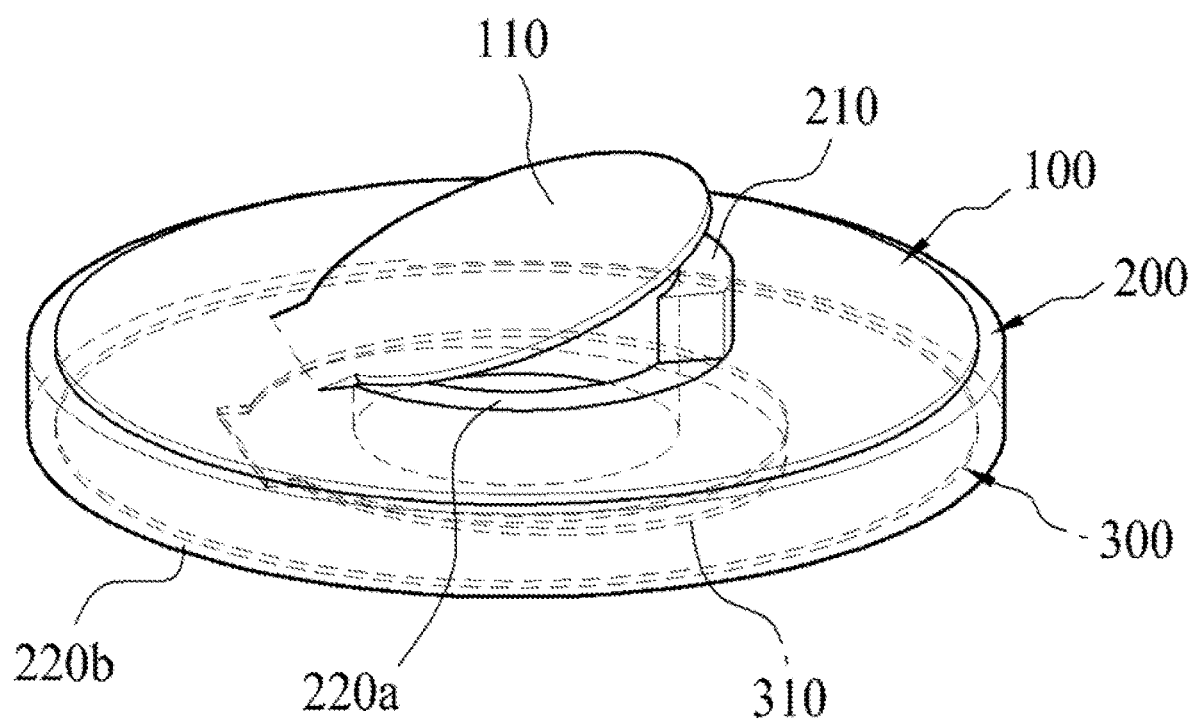
FIG. 6 is a front and top perspective view of the flow-controlling unit having the tilting angle limiting function of the flow-controlling piece according to an embodiment of the present invention.

FIG. 1 is a diagram illustrating a general household water supply device, FIG. 2 is a diagram illustrating an aspect in which the flow-controlling unit having the tilting angle limiting function of the flow-controlling piece according to an embodiment of the present invention is provided in an internal flow channel of the water supply apparatus, and FIG. 6 is a coupled perspective view of the flow-controlling unit having the tilting angle limiting function of the flow-controlling piece according to an embodiment of the present invention.

A flow-controlling unit according to an embodiment of the present invention is provided on an internal flow channel 10*a* of a water supply device 10 to control the flow rate. In the present embodiment, as illustrated in FIGS. 1 and 2, an example in which the flow-controlling unit is provided in a hot and cold water supply device 10 widely used in the general household will be described.

As illustrated in FIG. 6, the flow-controlling unit according to an embodiment of the present invention includes a flow-controlling plate 100 and a tilting angle limiting plate 200.

Hereinafter, a direction toward an inlet of the flow channel 10*a* into which fluid flows is referred to as a front, and a direction toward an outlet of the flow channel 10*a* from which the fluid is discharged is referred to as a back.

Further, in describing the present embodiment, the fluid is used in the meaning of including all of liquids such as water and oil, and gases such as air and oxygen.

Figure 3:
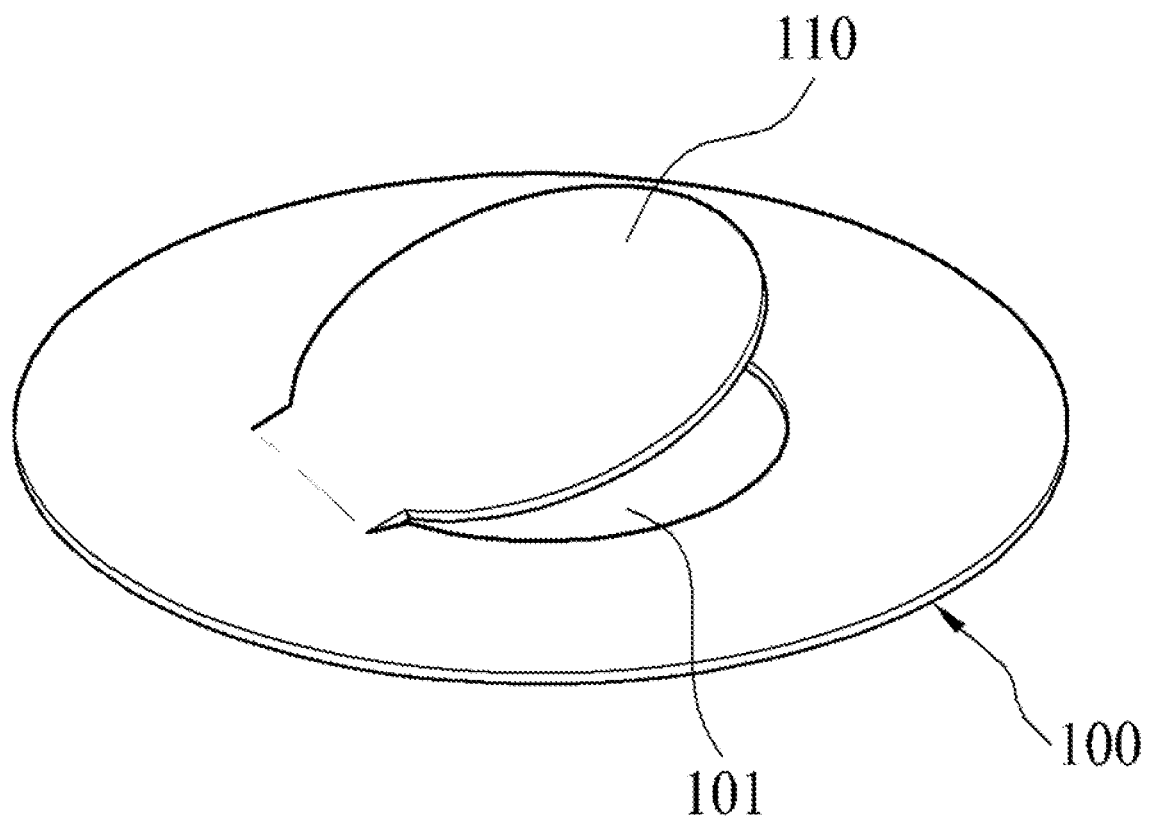
FIG. 3 is a front and top perspective view of a flow-controlling plate of the flow-controlling unit having the tilting angle limiting function of the flow-controlling piece according to an embodiment of the present invention.

FIG. 3 is a perspective view of the flow-controlling plate of the flow-controlling unit having the tilting angle limiting function of the flow-controlling piece according to an embodiment of the present invention.

As illustrated in FIG. 3, the flow-controlling plate 100 is located at the front-most of the flow-controlling unit of the present embodiment and is disposed to be perpendicular to the movement direction of the fluid on the flow channel 10*a*, and the flow-controlling plate 100 is formed with one or more first fluid through-holes 101 through which fluid passes.

The flow-controlling plate 100 may be formed in a circular shape, and may have a predetermined thickness. The thickness of the flow-controlling plate 100 may be determined in consideration of the hydraulic pressure of the fluid flowing through the flow channel 10*a* to which the flow-controlling plate 100 is applied, the cross-sectional area of the fluid channel 10*a*, and the like, and the thickness of the flow-controlling plate 100 applied to the flow channel 10*a* of the strong hydraulic pressure may be thickly formed.

Further, the flow-controlling plate 100 is preferably constructed of metal or synthetic resin having corrosion resistance but may be constructed of any suitable material known in the art.

Further, in a portion corresponding to the first fluid through-hole 101 of the flow-controlling plate 100, a flow-controlling piece 110 is formed which is provided to be tiltable by being inclined in the inflow direction of the fluid and is tilted by being pressed through the hydraulic pressure of the fluid to control the degree of opening of the first fluid through-hole 101. Accordingly, the variation range of the flow rate has become smaller, an appropriate amount of liquid is discharged, and the water-saving effect can be expected accordingly.

For example, when the flow rate of the fluid flowing through the flow channel 10*a* increases and the flow velocity becomes higher, the pressure for pressing the flow-controlling piece 110 rises, the flow-controlling piece 110 is tilted in the flow direction of liquid at a large angle accordingly, and the degree of opening between the flow-controlling piece 110 and the flow-controlling plate 100 can be narrowed. Thus, the flow rate passing through the first fluid through-hole 101 decreases, and the flow rate to be discharged to the outside through the faucet device may eventually decrease the flow rate flowing in the flow channel 10*a*.

Alternatively, when the flow rate of the fluid flowing in the flow channel 10*a* decreases and the flow rate is lowered, the pressure by which the fluid presses the flow-controlling piece 110 is relatively lowered, the flow-controlling piece 110 is tilted in the flowing direction of the fluid at a relatively small angle accordingly, and the first fluid through-hole 101 between the flow-controlling piece 110 and the flow-controlling plate 100 can become wider than the aforementioned case. Thus, the flow rate passing through the first fluid through-hole 101 increases, and the flow rate to be discharged to the outside through the faucet device may eventually relatively increase.

The variation range of the flow rate to be discharged to the outside through the faucet device is narrowed by the aforementioned principle, thereby obtaining a water-saving effect.

The flow-controlling piece 110 can be formed from the first fluid through-hole 101, by being partially cut from the flow-controlling plate 100, and by being bent to the inflow side of the fluid to form an inclination with the flow-controlling plate 100. That is, the flow-controlling plate 100 and the flow-controlling piece 110 may be formed integrally. Thus, it is possible to exhibit the water saving effect by minimal components.

When the flow-controlling piece 110 is formed integrally, the material of the flow-controlling plate 100 is an elastic material having a restoring force, and the flow-controlling piece 110 is pressed by the hydraulic pressure of the fluid, when the inclination with the flow-controlling plate 100 decreases, and when the hydraulic pressure is removed, the inclination with the flow-controlling plate 100 increases again, and the flow-controlling piece 110 can be restored to the original state.

Alternatively, the flow-controlling piece 110 can be coupled to a flow-controlling plate 100 as a separate member.

Although an example in which only the single first fluid through-hole 101 is formed is illustrated in the drawings, a plurality of the first fluid through-holes 101 may be formed. Further, the flow-controlling pieces 110 may be provided by the same number as the first fluid through-holes 101, and each of the flow-controlling pieces 110 may correspond to each of the first fluid through-holes 101.

Figure 4:
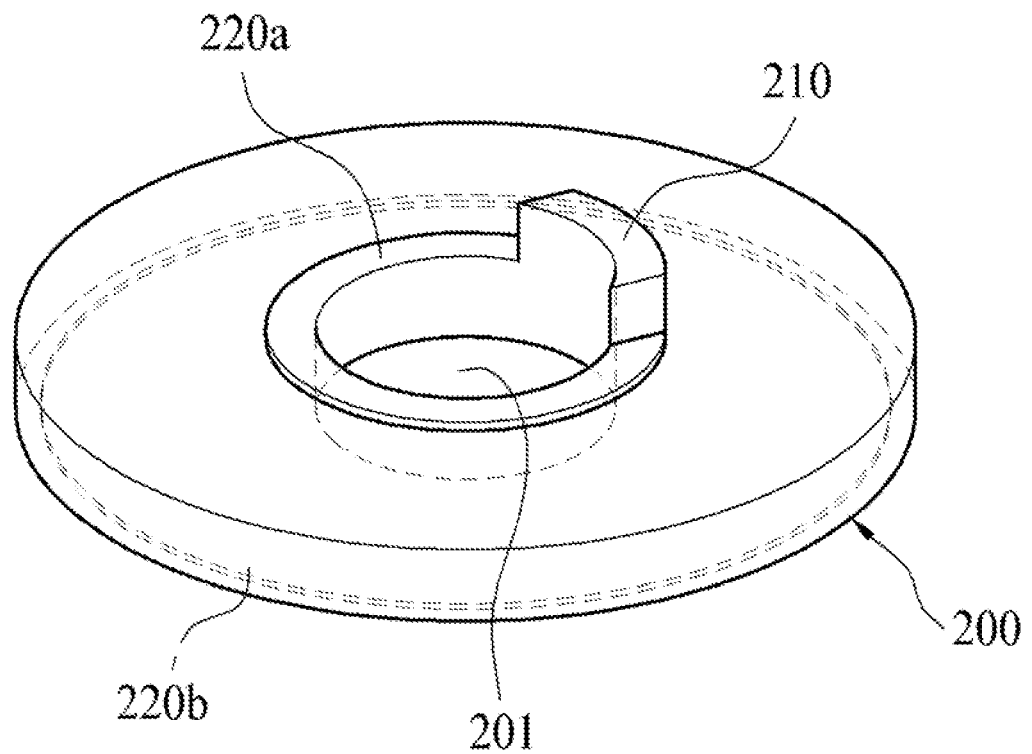
FIG. 4 is a front and top perspective view of a tilting angle limiting plate of the flow-controlling unit having the tilting angle limiting function of the flow-controlling piece according to an embodiment of the present invention.

FIG. 4 is a perspective view of the tilting angle limiting plate of the flow-controlling unit having the tilting angle limiting function of the flow-controlling piece according to an embodiment of the present invention.

As illustrated in FIG. 4, the tilting angle limiting plate 200 is provided behind the flow-controlling unit, and a second fluid through-hole 201 which communicates with the first fluid through-hole 101 is formed in the tilting angle limiting plate 200. By forming a minimum angle between the flow-controlling piece and the plate 110, it is possible to prevent a situation in which the flow-controlling piece 110 becomes parallel to the plate by the hydraulic pressure of the fluid to block the flow of fluid.

In the present embodiment, the tilting angle limiting plate 200 may be provided with a closing preventing portion 210 that is provided to have a height in at least a part of the edge portion of the second fluid through-hole 201, and protrudes to the front of the tilting angle limiting plate 200 through the first fluid through-hole 101.

When the elasticity of the flow-controlling piece 110 is lowered over time and the inclination formed by the flow-controlling plate 100 and the flow-controlling piece 110 decreases, the degree of opening of the fluid through-hole 101 is greatly narrowed, and the flow rate of the fluid to be discharged to the outside may decrease. Alternatively, when the flow-controlling piece 110 becomes parallel to the flow-controlling plate 100, and the fluid does not properly pass through the flow-controlling piece 110, a failure of the water supply device 10 may be caused. Accordingly, by providing the closing preventing portion 210 that limits the tilting angle of the flow-controlling piece 110 and ensures that an appropriate amount of fluid will always pass, it is possible to prevent a situation in which the flow-controlling piece 110 becomes parallel to the flow-controlling 100 due to the hydraulic pressure of the fluid, to block the flow of fluid.

Further, the tilting angle limiting plate 200 may be formed to have a thickness greater than the thickness of the flow-controlling plate 100, thereby reinforcing the flow-controlling plate 100 against the hydraulic pressure.

The flow-controlling plate 100 may be formed of a very thin plate, and there is a possibility that as the continuous hydraulic pressure acts from one direction, the flow-controlling plate 100 is likely to be bent or damaged in a direction in which the hydraulic pressure acts. Therefore, when the tilting angle limiting plate 200 with a predetermined thickness supports the flow-controlling plate 100 behind the flow-controlling plate 100, it is possible to prevent the deformation and damage of the flow-controlling plate 100. The tilting angle limiting plate 200 is preferably constructed of synthetic resin or metal having a high strength to sufficiently reinforce the flow controlling plate 100, but may constructed of any suitable material known in the art.

Meanwhile, the diameter of the first fluid through-hole 101 may be formed to be larger than the diameter of the second fluid through-hole 201. Further, in the tilting angle limiting plate 200, a first horizontal movement preventing portion 220a may be formed in which the peripheral of the second fluid through-hole 201 protrudes to the flow-controlling plate 100 side and is inserted into the first fluid through-hole 101. The height of the first horizontal movement preventing portion 220a may be formed to be equal to the thickness of the flow-controlling plate 100 or to be lower than the thickness of the flow-controlling plate 100. Further, the diameter of the first horizontal movement preventing portion 220a is formed to be equal to or slightly smaller than the diameter of the first fluid through-hole 101, and the first horizontal movement preventing portion 220a is inserted into the first fluid through-hole 101 to limit the horizontal movement of the flow-controlling plate 100.

Figure 5:
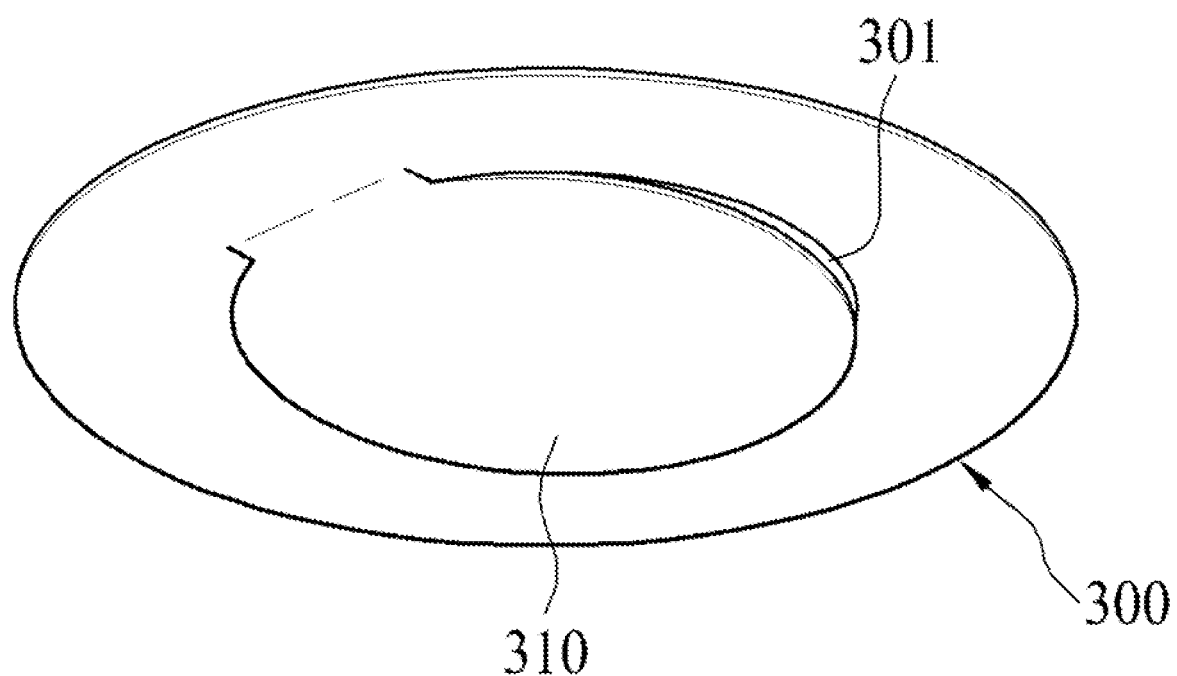
FIG. 5 is a front and bottom perspective view of a backflow preventing plate of the flow-controlling unit having the tilting angle limiting function of the flow-controlling piece according to an embodiment of the present invention.

FIG. 5 is a perspective view of a backflow preventing plate of the flow-controlling unit having the tilting angle limiting function of the flow-controlling piece according to an embodiment of the present invention.

As illustrated in FIG. 5, the backflow preventing plate 300 is provided behind the tilting angle limiting plate 200 in contact with the tilting angle limiting plate 200, and a third fluid through-hole 301 which communicates with the first fluid through-hole 101 and the second fluid through-hole 201 is formed in the backflow preventing plate 300.

A backflow preventing piece 310 may be formed in the backflow preventing plate 300. The backflow preventing piece 310 is provided to be inclined in the discharge direction of the fluid and tiltable, and prevents the backflow of the fluid, by being pressed through the hydraulic pressure at the time of backflow of the fluid and by being tilted in the inflow direction of the fluid.

That is, the backflow preventing plate 300 has the shape similar to the flow-controlling plate 100, and may be provided to come into contact with the tilting angle limiting plate 200 in a direction opposite to the flow-controlling plate 100.

The diameter of the backflow preventing piece 310 is formed to be larger than the diameter of the second fluid through-hole 201, and the backflow preventing piece 310 can be supported by the tilting angle limiting plate 200.

Further, the backflow preventing plate 300 may be formed of a thin plate having a thickness thinner than the flow-controlling plate 100. In general, when the fluid flows from the inlet, the degree of opening of the third fluid through-hole 301 needs to be easily widened such that the fluid can smoothly flow. Further, since the flow rate of the fluid flowing backward is relatively small, the backflow preventing piece 310 needs to be tilted by the small hydraulic pressure of the fluid flowing backward. Thus, the backflow preventing plate 300 may be formed of a thin plate.

When the fluid does not flow, the backflow preventing piece 310 is closed or forms a small angle with the backflow preventing plate 300, and thereafter, when the fluid flows in from the inlet, the backflow preventing piece 310 is pressed by the hydraulic pressure, and the degree of opening of the third fluid through-hole 301 can increase in the angle formed together with the backflow preventing plate 300.

Further, when the fluid flows backward to the inlet side, the backflow preventing piece 310 is pressed in the direction toward the inlet, and the angle formed together with the backflow preventing plate 300 becomes smaller. Eventually, the backflow preventing piece 310 is completely closed, and the edge of the backflow preventing piece 310 is supported by the tilting angle limiting plate 200, thereby making it possible to prevent the fluid from flowing in the backward direction through the third fluid through-hole 301.

Further, a second horizontal movement preventing portion 220b protruding in the discharge direction of the fluid can be formed at the edge of the tilting angle limiting plate 200. Further, when the backflow preventing plate 300 is inserted into the inside of the second horizontal movement preventing portion 220, the horizontal direction of the backflow preventing plate 300 can be limited. To this end, the inner diameter of the second horizontal movement preventing portion 220b may be formed to be equal to the diameter of the backflow preventing plate 300 or to be larger than the diameter of the backflow preventing plate 300.

Hereinafter, the operation of the flow-controlling unit provided with the tilting angle limiting plate 200 and the backflow preventing plate 300 according to the present invention embodiment will be described with reference to the drawings.

Generally, since the cold water that flows in through the water pipe has a higher water pressure than the water pressure of the hot water supplied from the boiler, when the cold water and the hot water are mixed, the cold water may flow backward to the hot side with the weak water pressure. Accordingly, an example in which the flow-controlling unit of the present embodiment is provided in the hot water supply pipe will be described.

Figure 7:
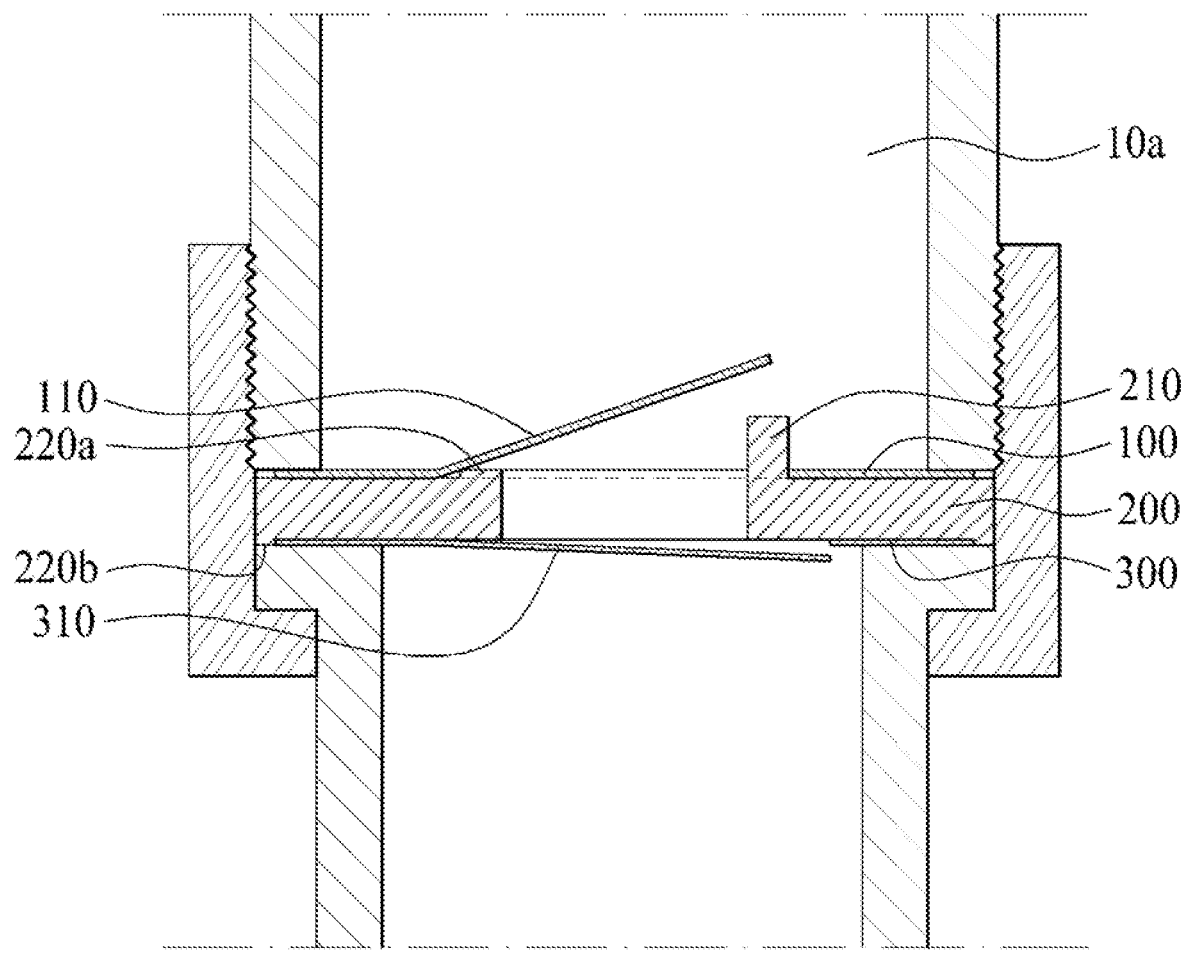
FIG. 7 is a front cross-sectional view illustrating the flow-controlling unit having the tilting angle limiting function of the flow-controlling piece according to an embodiment of the present invention, when the fluid does not flow.

FIG. 7 is a cross-sectional view illustrating a flow-controlling unit having the tilting angle limiting function of the flow-controlling piece according to an embodiment of the present invention, when the fluid does not flow.

As illustrated in FIG. 7, in the state in which the fluid does not flow, the flow-controlling piece 110 forms an initial angle with the flow-controlling plate 100, the flow-controlling piece 110 and the closing preventing portion 210 are spaced apart from each other, and the backflow preventing piece 310 is almost closed or forms a very small angle with the backflow preventing plate 300.

Figure 8:
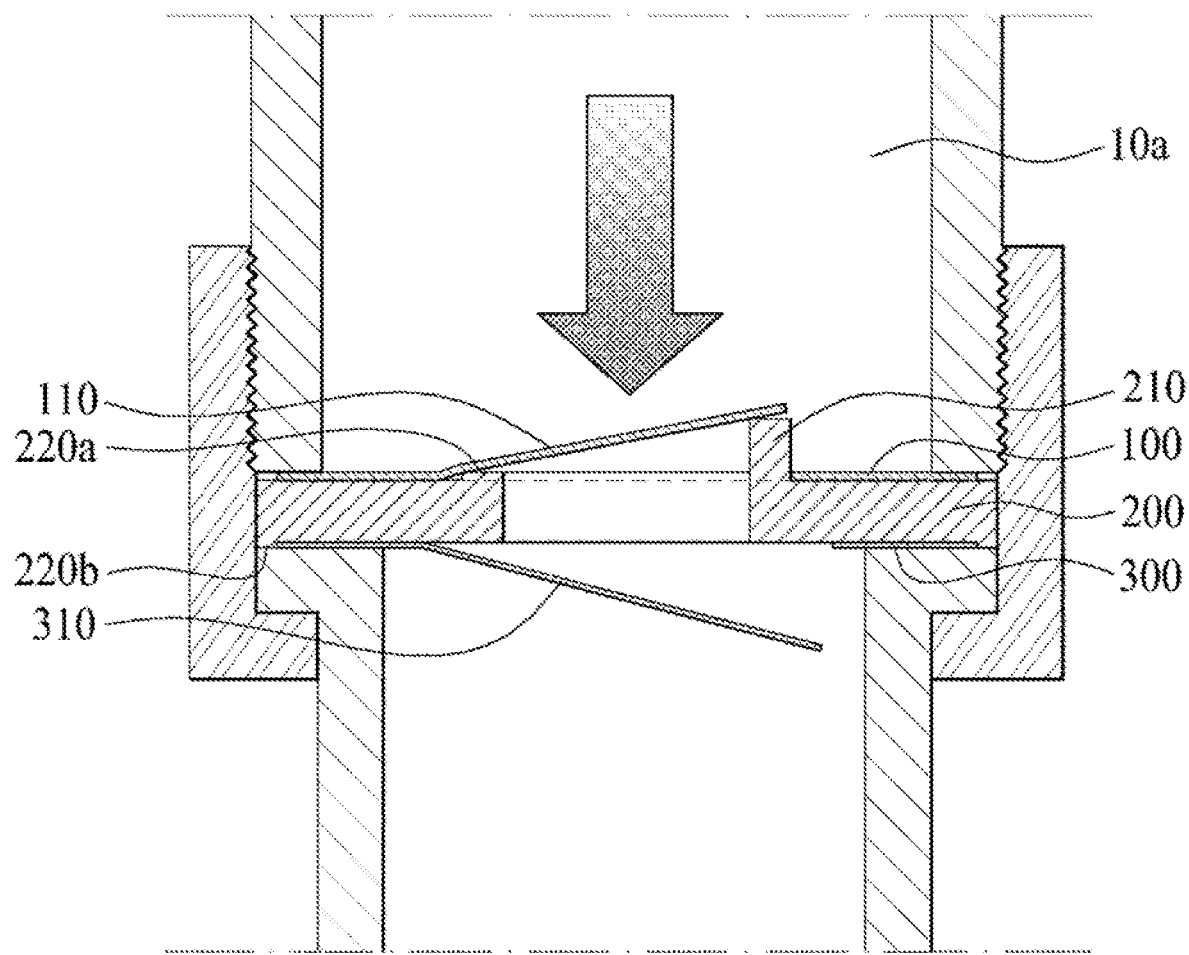
FIG. 8 is a front cross-sectional view illustrating the flow-controlling unit having the tilting angle limiting function of the flow-controlling piece according to an embodiment of the present invention, when the fluid normally flows.

FIG. 8 is a cross-sectional view illustrating the flow-controlling unit having the tilting angle limiting function of the flow-controlling piece according to an embodiment of the present invention, when the fluid normally flows.

As illustrated in FIG. 8, in the case using the hot water, when the hot water flows in from the inlet, the flow-controlling piece 110 is pressed by the hydraulic pressure of the fluid, and is tilted with respect to the flow-controlling plate 100, and the angle formed between the flow-controlling piece 110 and the flow-controlling plate 100 can decrease accordingly.

When controlling the water supply device 10 to discharge a lot of flow rate, the hydraulic pressure acting on the flow-controlling piece 110 also increases with an increase in flow rate, and the angle formed between the flow-controlling piece 110 and the flow-controlling plate 100 can decrease accordingly. Thus, as described above, the flow rate fluctuation range can be controlled.

If the very strong hydraulic pressure acts on the flow-controlling piece 110, the flow-controlling piece 110 tries to be closed, but the flow-controlling piece 110 can maintain the minimal angle with the flow-controlling plate 100 by the closing preventing portion 210.

Further, if the fluid flows from the inlet, the backflow preventing piece 310 is tilted in the flow direction of fluid, and the fluid can smoothly flow as the degree of opening of the third fluid through-hole 301 is widened.

Figure 9:
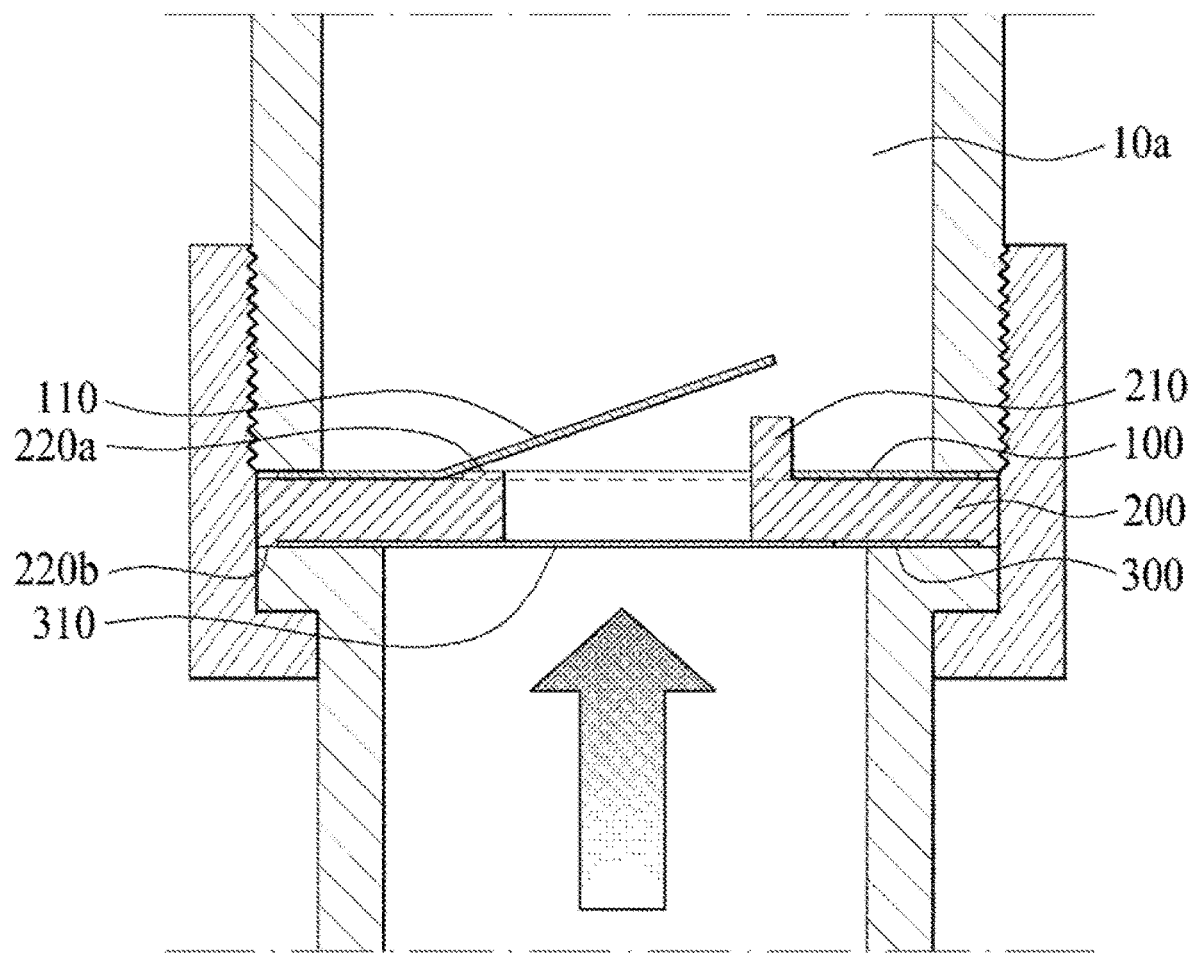
FIG. 9 a front cross-sectional view illustrating the flow-controlling unit having the tilting angle limiting function of the flow-controlling piece according to an embodiment of the present invention, when the fluid flows backward.

FIG. 9 is a cross-sectional view illustrating the flow-controlling unit having the tilting angle limiting function of the flow-controlling piece according to an embodiment of the present invention, when the fluid flows backward.

When a user tries to receive a supply of cold water or hot water of a suitable temperature, since the water pressure of the cold water is higher than the water pressure of the hot water, the cold water may flow backward into the hot water pipe.

At this time, as illustrated in FIG. 9, the backflow preventing piece 310 is tilted toward the hot water inlet side by the hydraulic pressure of the cold water, the backflow preventing piece 310 is supported by the periphery of the second fluid through-hole 201 of the tilting angle limiting plate 200, and the backflow preventing piece 310 may be completely closed. Thus, the backflow of the cold water into the hot water side can be prevented.

Thus, it is possible to solve the problem which occurs when the cold water and the hot water are mixed, the cold water, which typically has a higher water pressure, flows backward toward the hot water with weaker water pressure supplied from a boiler, the fuel cost for producing the hot water increases[[,]] and the economic efficiency is lowered. In addition, when using the hot water forced backward by the cold water, there is a need to discharge a certain amount of water. However, because the hot water of the appropriate temperature is supplied, its usage is cumbersome. Also, since the hot water supplied until the supply the hot water of a suitable temperature arrives is discarded, it is possible to solve a problem of wasted water.

A flow-controlling unit according to another embodiment of the present invention will be described below.

Figure 10:
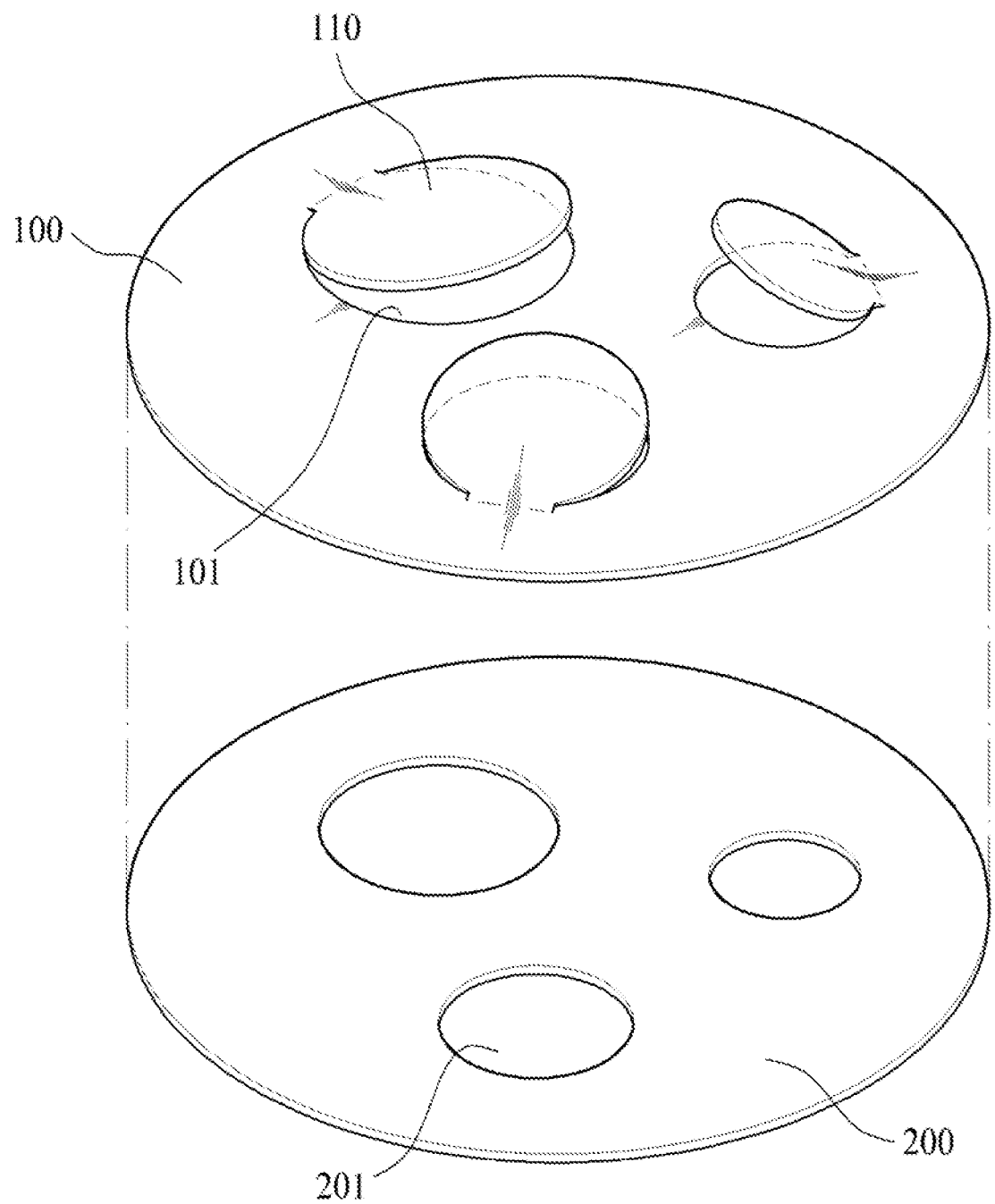
FIG. 10 is a front and top exploded perspective view of a flow-controlling unit having a tilting angle limiting function of a flow-controlling piece according to another embodiment of the present invention.
Figure 11:
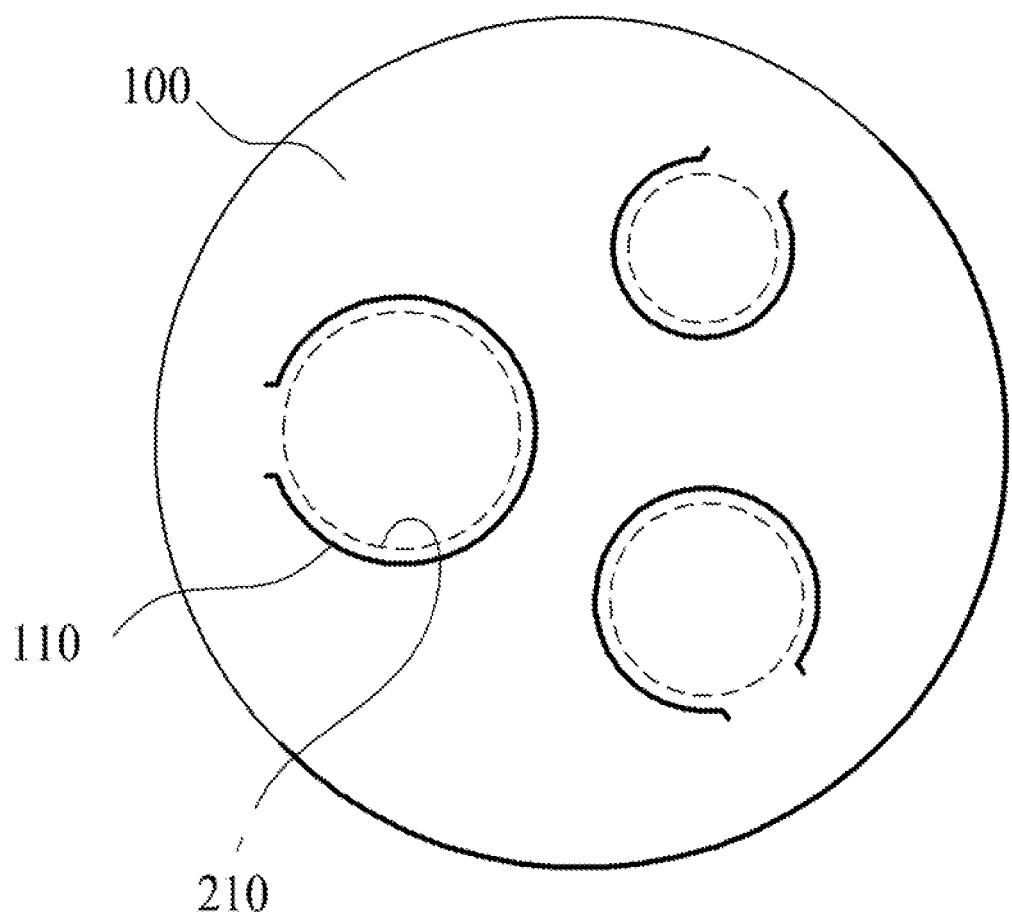
FIG. 11 is a top plan view illustrating an aspect in which the flow-controlling plate of the flow-controlling unit having the tilting angle limiting function of the flow-controlling piece according to another embodiment of the present invention is coupled with the tilting angle limiting plate.

FIG. 10 is an exploded perspective view of a flow-controlling unit having a tilting angle limiting function of a flow-controlling piece according to another embodiment of the present invention. FIG. 11 is a diagram illustrating an aspect in which the flow-controlling plate of the flow-controlling unit having the tilting angle limiting function of the flow-controlling piece according to another embodiment of the present invention is coupled with the tilting angle limiting plate.

As illustrated in FIGS. 10 and 11, the flow-controlling unit according to another embodiment of the present invention includes a flow-controlling plate and a tilting angle limiting plate.

However, the tilting angle limiting plate 200 of the present embodiment is configured in a plate shape as in the flow-controlling plate 100 and is provided behind the flow-controlling plate 100, and a second fluid through-hole 201 that communicates with the first fluid through-hole 101 is formed at the position corresponding to the first fluid through-hole 101 in the tilting angle limiting plate 200. Further, the diameter of the second fluid through-hole 201 may be formed to be smaller than the diameter of the first fluid through-hole 101. Thus, since the flow-controlling piece 110 is supported by the tilting angle limiting plate 200, the tilting angle of the flow-controlling piece 110 can be limited.

While the preferred embodiments according to the present invention have been described, it will be obvious to those of ordinary skill in the art that the present invention can be embodied in other specific forms without depart from its spirit or categories, in addition to the previously described embodiments. Accordingly, the aforementioned embodiments should be considered as being illustrative rather than being limiting, and the present invention may be varied within the category of the appended claims and their equivalents, without being limited to the foregoing description, accordingly.

The invention claimed is:

1. A flow-controlling unit comprising:
    a flow-controlling plate which is disposed in a horizontal direction perpendicular to a movement axis of a fluid in a flow channel, and in which at least one first fluid through-hole through which the fluid passes is formed, also in which at least one flow-controlling piece is formed, each flow-controlling piece being aligned with a respective first fluid through-hole and inclined in an inflow direction such that each flow-controlling piece is tiltable, the at least one flow controlling piece controlling a degree of opening of the at least one first fluid through-hole by being tilted by the hydraulic pressure of the fluid, such that as the hydraulic pressure of the fluid increases, the degree of opening is narrowed; and
    a tilting angle limiting plate located in a discharge direction, which is disposed opposite of the inflow direction, with respect to the flow-controlling plate and supporting the flow-controlling plate in the flow channel, the tilting angle limiting plate having at least one second fluid through-hole, which communicates with a respective first fluid through-hole, a diameter of the at least one second fluid through-hole being formed to be smaller than a diameter of the respective first fluid through-hole to allow the at least one flow-controlling piece to be supported, wherein at least one closing preventing portion is formed in the tilting angle limiting plate, the at least one closing preventing portion being provided to have a height in at least part of an edge of a respective second fluid through-hole and protruding in the inflow direction through the respective first fluid through-hole, the at least one flow-controlling piece configured to contact a respective closing preventing portion when the at least one flow-controlling piece is tilted toward the horizontal direction by the hydraulic pressure of the fluid, thereby limiting the tilting angle of the at least one flow-controlling piece to prevent a situation in which the flow-controlling piece is oriented in the horizontal direction parallel to the flow-controlling plate and completely blocks the flow of fluid.

2. The flow-controlling unit of claim 1, wherein a first horizontal movement preventing portion is formed in the tilting angle limiting plate, at the edge of the at least one second fluid through-hole, the first horizontal movement preventing portion configured to extend into the respective at least one first fluid through-hole to limit horizontal movement of the flow-controlling plate with respect to the tilting angle limiting plate.

3. The flow-controlling unit of claim 1, further comprising:
    a backflow preventing plate in which a third fluid through-hole, which communicates with the at least one first fluid through-hole and the at least one second fluid through-hole, is formed, the backflow preventing plate being provided in contact with the tilting angle limiting plate to prevent flowing of the fluid in the inflow direction.

4. The flow-controlling unit of claim 3, wherein a backflow preventing piece is formed in the backflow preventing plate, the backflow preventing piece being inclined in the discharge direction such that the backflow preventing piece is tiltable, the backflow preventing piece configured to prevent flow of fluid in the inflow direction by being pressed by hydraulic pressure when fluid flows in the inflow direction by the backflow preventing piece being tilted toward the horizontal direction.

5. The flow-controlling unit of claim 4, wherein the diameter of the backflow preventing piece is formed to be greater than the diameter of the at least one second fluid through-hole, and the backflow preventing piece is supported by the tilting angle limiting plate when the fluid flows in the inflow direction.

6. The flow-controlling unit of claim 3, wherein the backflow preventing plate is formed of a thin plate having a thickness smaller than a thickness of the flow-controlling plate.

7. The flow-controlling unit of claim 3, wherein a second horizontal movement preventing portion, which protrudes in the discharge direction, is formed at an edge of the tilting angle limiting plate, and the backflow preventing plate is inserted into the second horizontal movement preventing portion to limit the horizontal movement of the backflow preventing plate.

8. The flow-controlling unit of claim 1, wherein the at least one flow-controlling piece forms the at least one first fluid through-hole, by being partially cut from the flow-controlling plate and by being bent to the inflow direction to form the inclination with the flow-controlling plate.

9. The flow-controlling unit of claim 1, wherein the at least one flow-controlling piece is constructed from an elastic material such that a restoring force is provided to return the at least one flow-controlling piece to its original position when the hydraulic pressure is removed.

10. The flow-controlling unit of claim 1, wherein the flow-controlling unit comprises a plurality of first fluid through-holes and a plurality of flow-controlling pieces, each disposed in a respective first fluid through-hole.

* * * * *